UNITED STATES PATENT OFFICE.

HORACE WILLIAMS AND JOHN L. ALBERGER, OF BUFFALO, NEW YORK.

METHOD OR PROCESS OF MANUFACTURING GLUCOSE FROM GRAIN.

SPECIFICATION forming part of Letters Patent No. 243,669, dated June 28, 1881.

Application filed October 28, 1880. (No specimens.)

*To all whom it may concern:*

Be it known that we, HORACE WILLIAMS and JOHN L. ALBERGER, of Buffalo, in the county of Erie and State of New York, have jointly invented a new and Improved Process of Manufacturing Crystallizable Grape-Sugar from Corn or other Cereals, of which the following is a description in such full, clear, concise, and exact terms as to enable any one skilled in the arts to which it is most nearly connected to work or practice the same.

The object of this invention is to eliminate more perfectly the unconverted starch, dextrine, oils, acids, alkali, and all the elements of the grain and process that impart to the crystallized sugar its impurity, bad odor, or flavor; and our said invention consists of the following process of treating the starch, soluble dextrine, sirup, and crystallized sugar by which the aforesaid object is obtained.

First, we take starch or soluble dextrine made of starch or grain and treat it in a vessel of suitable construction, under the action of steam-heat, in a solution of acid and water strong enough to convert the starch into dextrine and the dextrine into sirup or sugar-liquor, the treatment to be continued until the conversion is perfected, to be ascertained by the usual test. The solution should be composed of about forty pounds of starch, three-fourths of a pound of acid, and twenty gallons of water.

Second, after thus converting the starch and dextrine into sirup, as aforesaid, we neutralize the acid in the sirup with alkali or any of the well-known neutralizing agents for this purpose, then separate the neutralizing agent by filtering in the usual way, then decolorize the sirup with bone-black, filtering, or by any other means known to the art, and then boil the sirup in a vacuum-pan to 33° or 35° Baumé with a temperature of 120° Fahrenheit. To neutralize the acid in the sirup, about two per cent. of alkali should be used.

Third, the sirup having been thus purified, decolorized, and reduced, it is drawn into a receiver of suitable construction, where we allow it to cool to the ordinary temperature of the atmosphere, taking care not to freeze it. We then proceed to induce crystallization. This is done by rapidly mixing into the sirup a small percentage—say one per cent.—of finely-powdered grape-sugar, by which there are furnished granules for the crystals to form upon. Now, by allowing the mass to stand quietly for ten or twelve hours, the sugar will crystallize throughout, leaving the mother-liquor free in the receiver. Having reached this stage of the process, the sugar, in crystallizing, separates itself from the impurities of the sirup, and would be pure sugar did not the impurities of the sirup adhere to the outside of the crystals. The final step then is to free the crystallized sugar from the mother-liquor or sirup remaining after crystallization. This we do either by putting the crystallized sugar into a centrifugal and throwing out the mother-liquor or remaining sirup, washing it or not in the centrifugal, as may be required, or by putting the crystallized sugar into a mixer of any suitable construction and mixing with it from five to ten per cent. of water reduced to 32° of Fahrenheit, or as near to that as possible, the object of this cold-water treatment being to wash the crystals without melting them, after which we place the crystallized sugar, liquor, and water in bags or sacks and expel the water and liquor by means of a hydraulic press, leaving within the sacks a pure hard sugar, which may be remelted and worked or cast in blocks or cakes, or ground and pulverized.

In this process, if any of the starch or dextrine be left unconverted in any of its steps, the unconverted starch or dextrine will be carried off with the mother-liquor, leaving the sugar pure, the starch or dextrine to be again treated as before.

The sugar produced by this process is of great value in the arts, in which it has a wide range of use, such as sweetening wines, cider, &c., and for making ales or spirituous liquor, and for sweetening table fruits, &c., the sugar of this process being perfectly pure and free from the usual flavors that characterize the grape-sugar made by the processes now in use.

Having thus described our process, we claim and desire to secure by Letters Patent—

1. The process, as a whole, substantially herein described, of manufacturing and crystallizing grape-sugar from corn or cereals, consisting of first converting the starch and dextrine into sirup in a solution of acid and water under steam-heat, then neutralizing the acid, then separating the neutralizing residuum, then filtering with bone-black, then reducing in a vacuum-pan, then cooling the reduced or concentrated sirup, then adding a small percentage of powdered grape-sugar, then washing the crystallized sugar in cold water, and finally throwing or pressing out the mother-liquor, substantially as described.

2. The process, substantially herein described, of washing off and eliminating the impurities of crystallized grape-sugar by pressure or centrifugal force, as set forth.

HORACE WILLIAMS.
JOHN L. ALBERGER.

Witnesses:
F. S. MILLER, Jr.,
I. KEILHOLTZ.

DEPARTMENT OF THE INTERIOR,
UNITED STATES PATENT OFFICE,
*Washington, D. C., July 29, 1881.*

*Whereas*, Horace Williams and John L. Alberger have, in writing, refused to receive Letters Patent No. 243,669, dated June 28, 1881, on the ground that the specification thereof does not correspond with that filed in the application upon which the Patent was granted, but by mistake of the Patent Office an amendment intended for another case was erroneously substituted for the specification properly in this case; *it is hereby ordered*, that said Letters Patent No. 243,669 be returned to the files and marked "canceled;" *and it is further ordered*, that Letters Patent, in due form, for the invention therein shown and described be issued to the said Horace Williams and John L. Alberger, pursuant to the petition and record in the case.

E. M. MARBLE,
*Commissioner of Patents.*

Approved:
S. J. KIRKWOOD,
*Secretary.*